United States Patent Office 3,134,007
Patented May 19, 1964

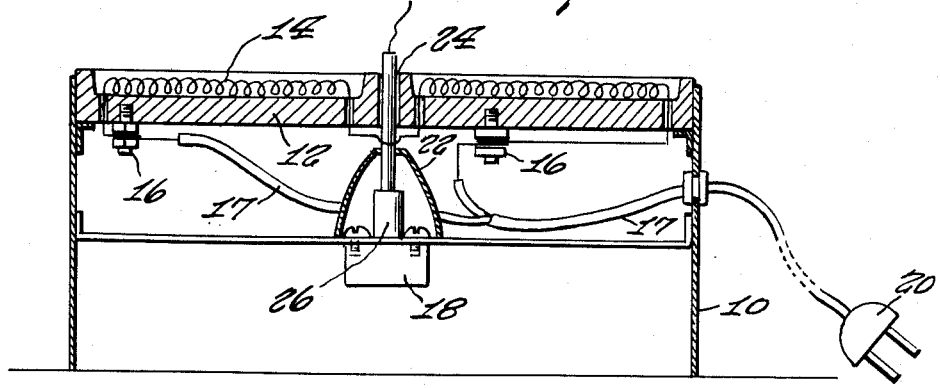
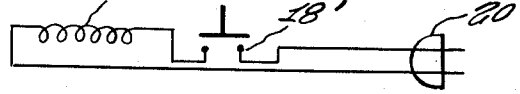
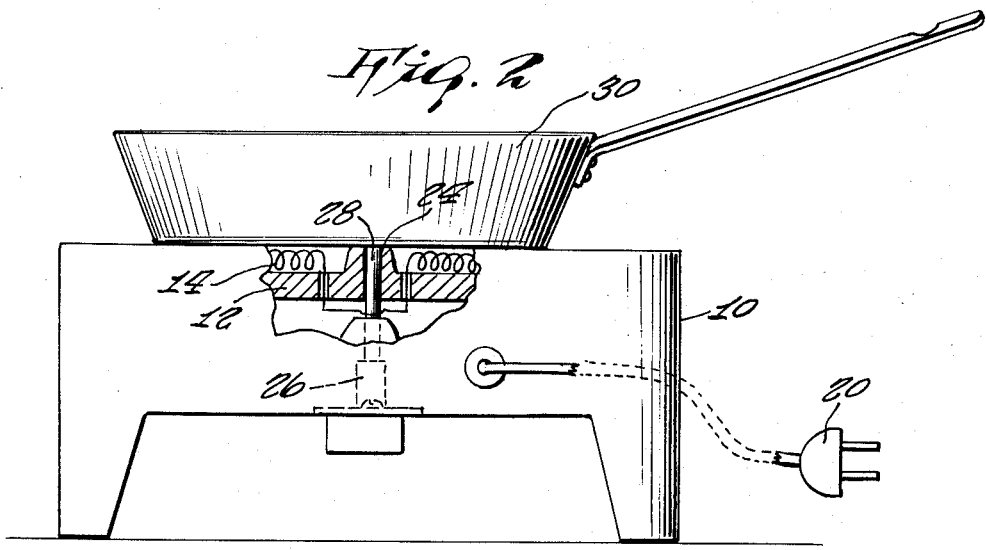
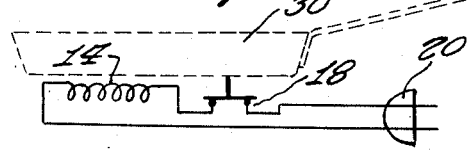
INVENTOR.
HARRY W. NIBLO
BY
Carl Miller
ATTORNEY

3,134,007
ELECTRIC HOT PLATE STOVE
Harry W. Niblo, 301 Livingston St., Brooklyn 17, N.Y.
Filed Dec. 29, 1961, Ser. No. 163,230
1 Claim. (Cl. 219—37)

My invention is directed toward electric stoves of the type sometimes designated as electric hot plates.

It is an object of my invention to provide a new and improved electric stove wherein the stove is automatically turned on when a vessel is placed on the stove and is automatically turned off when the vessel is removed from the stove.

Another object of my invention is to provide a new and improved electric stove of the type described wherein the stove is turned on or off by a plunger, the plunger being controlled by placing a vessel on the stove or removing the vessel from the stove.

Still another object of my invention is to provide a new and improved electric stove of the type described which can be easily manufactured at low cost.

All of the foregoing and still further objects and advantages of this invention will either be explained or will become apparent from a study of the following specification, taken in conjunction with the accompanying drawing, wherein:

FIGURE 1 is a side cross sectional view of the invention;

FIGURE 1a is a circuit diagram of the invention shown in FIGURE 1;

FIGURE 2 is a side view, partially in cross section, of the invention with a vessel placed on top thereof to turn the stove on; and FIGURE 2a is a circuit diagram of the invention as shown in FIGURE 2.

Referring now to the drawings, there is shown a metal stand or base 10. Mounted in the top of stand 10 is an electrical heating element of the pancake type having a ceramic form 12 wound with high electrical resistance wire in the form of a coil 14. Opposite ends of coil 14 are connected to screw terminals 16. Copper conductors 17 connect terminals 16 through a switch 18 to an electrical outlet plug 20. Plug 20 is adapted for connection to a conventional 120 volt, 60 cycles per second alternating voltage power supply. Coil 14 is connected in series with switch 18 and plug 20. Switch 18 is covered with a thin metal cowling 22 to protect the switch from drippings from the cooking above and also to lend neatness to the product.

A spring loaded electrically non-conductive plunger extends upward from switch 18 through cowling 22 and an opening 24 centrally positioned in the ceramic form. The plunger consists of a spring loaded section 26 and a vertical ceramic rod 28 secured at one end to section 26, the rod 28 projecting upward through the cowling 22 and opening 24.

When plug 20 is connected to an alternating voltage power supply, and a vessel 30 is placed on top of the heating element, rod 28 is depressed, switch 18 is closed, and the stove is turned on. When vessel 30 is removed from the stove, the spring loaded section 26 pushes rod 28 upward to its original position, switch 18 is opened, and the stove is turned off.

While my invention has been described with particular reference to the construction shown in the drawing, it is to be understood that such is not to be construed as imparting limitations upon my invention which is best defined by the claim appended hereto.

Having thus described my invention, I claim as new and desire to be secure by Letters Patent:

An electric hot plate stove comprising a stand, a ceramic plate form supported by said stand and having a centrally disposed opening therethrough, a high electrical resistance heating element supported by said plate form, a plunger actuated normally open switch centrally supported in said stand below said plate form and connected in series with said element to pass current for heating when closed, a cowling supported in said stand between said switch and plate form to protect said switch from drippings, said cowling having a centrally disposed opening therethrough alined with the opening through said plate form, and an electrically non-conductive plunger extending from said switch through the openings through said cowling and plate form to be contacted by a vessel placed on said plate form for closing said switch to pass current to said element.

References Cited in the file of this patent
UNITED STATES PATENTS

| 1,637,155 | Marsden | July 26, 1927 |
| 2,417,223 | Visitacion | Mar. 11, 1947 |

FOREIGN PATENTS

| 805,538 | Germany | Mar. 15, 1951 |
| 972,896 | France | Feb. 5, 1951 |